United States Patent
Moran et al.

(10) Patent No.: US 10,820,035 B2
(45) Date of Patent: *Oct. 27, 2020

(54) METHODS FOR CONTROLLING PRESENTATION OF CONTENT USING A MULTI-MEDIA TABLE

(71) Applicant: DISH Technologies L.L.C., Englewood, CO (US)

(72) Inventors: Lawrence Moran, Aurora, CO (US); Brandon Halper, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,915

(22) Filed: Aug. 9, 2019

(65) Prior Publication Data
US 2019/0364323 A1    Nov. 28, 2019

Related U.S. Application Data

(63) Continuation of application No. 15/351,129, filed on Nov. 14, 2016, now Pat. No. 10,382,806.

(51) Int. Cl.
*H04N 5/445* (2011.01)
*G06F 3/00* (2006.01)
(Continued)

(52) U.S. Cl.
CPC ....... *H04N 21/4147* (2013.01); *G06F 1/1601* (2013.01); *G06F 1/1605* (2013.01);
(Continued)

(58) Field of Classification Search
CPC ........... H04N 21/6125; H04N 21/4825; H04N 21/4312; H04N 21/42224; H04N 21/4147;
(Continued)

(56) References Cited

U.S. PATENT DOCUMENTS 6,067,078 A  *  5/2000  Hartman ................ B60K 35/00
                                                        345/168
6,417,869 B1      7/2002  Do
(Continued)

*Primary Examiner* — Nasser M Goodarzi
*Assistant Examiner* — Patrick A Ryan

(57) ABSTRACT

Media content presentation methods are operable to control content presentation on a touch-sensitive display of a multi-media table that is communicatively coupled to a media device that is operable to access the media content. An exemplary embodiment receives, at the multi-media table from the media device, a media content event; presents the media content event on a portion of the touch-sensitive display of the multi-media table; detects a gesture-based touch movement made by a user on the touch-sensitive display; determines an intended user command based on the detected gesture-based touch movement; generates a media device command when the intended user command is configured to control presentation of the media content event; and communicates the generated media device command from the multi-media table to the media device, wherein the media device controls the media content event in accordance with the received media device command.

20 Claims, 2 Drawing Sheets

(51) Int. Cl.

| | | |
|---|---|---|
| *G06F 13/00* | (2006.01) | |
| *H04N 21/4147* | (2011.01) | |
| *G06F 3/0488* | (2013.01) | |
| *G06F 3/0481* | (2013.01) | |
| *H04N 21/422* | (2011.01) | |
| *H04N 21/414* | (2011.01) | |
| *H04N 21/482* | (2011.01) | |
| *H04N 21/41* | (2011.01) | |
| *H04N 21/61* | (2011.01) | |
| *H04H 20/62* | (2008.01) | |
| *H04N 21/6587* | (2011.01) | |
| *H04N 21/426* | (2011.01) | |
| *H04N 21/436* | (2011.01) | |
| *H04N 21/4402* | (2011.01) | |
| *G06F 1/16* | (2006.01) | |
| *G06F 1/18* | (2006.01) | |

(52) U.S. Cl.
CPC ............ *G06F 1/1607* (2013.01); *G06F 1/169* (2013.01); *G06F 1/1656* (2013.01); *G06F 1/1688* (2013.01); *G06F 1/182* (2013.01); *G06F 3/04817* (2013.01); *G06F 3/04883* (2013.01); *H04H 20/62* (2013.01); *H04N 21/4122* (2013.01); *H04N 21/4126* (2013.01); *H04N 21/41422* (2013.01); *H04N 21/4263* (2013.01); *H04N 21/42224* (2013.01); *H04N 21/43615* (2013.01); *H04N 21/4402* (2013.01); *H04N 21/4821* (2013.01); *H04N 21/4825* (2013.01); *H04N 21/6125* (2013.01); *H04N 21/6587* (2013.01); *G06F 2203/04808* (2013.01)

(58) Field of Classification Search
CPC ........... H04N 21/6587; H04N 21/4126; H04N 21/41422; G06F 3/04883; G06F 3/04817; G06F 2203/04808; H04H 20/62
See application file for complete search history.

(56) References Cited

U.S. PATENT DOCUMENTS

| | | | |
|---|---|---|---|
| 6,788,241 | B2 | 9/2004 | Arling et al. |
| 8,817,185 | B2* | 8/2014 | Kazawa ............... H04N 5/4403 340/5.8 |
| 8,819,726 | B2* | 8/2014 | Wetzer ............ H04N 21/25816 705/14.27 |
| 9,253,533 | B1 | 2/2016 | Morgan et al. |
| 2007/0050054 | A1 | 3/2007 | Sambandam Guruparan et al. |
| 2009/0085764 | A1 | 4/2009 | Jee |
| 2010/0157168 | A1* | 6/2010 | Dunton ................ H04N 5/4403 348/734 |
| 2011/0321096 | A1 | 12/2011 | Landow et al. |
| 2012/0162536 | A1* | 6/2012 | Sibilsky ........... H04N 21/42209 348/734 |
| 2012/0233651 | A1* | 9/2012 | Lee .................... H04N 21/4622 725/110 |
| 2013/0104160 | A1 | 4/2013 | Beeson et al. |
| 2014/0237518 | A1* | 8/2014 | Liu .................. H04N 21/43615 725/75 |
| 2015/0370915 | A1 | 12/2015 | Kim |
| 2017/0010788 | A1 | 1/2017 | Srinivasaraghavan et al. |

* cited by examiner

METHODS FOR CONTROLLING PRESENTATION OF CONTENT USING A MULTI-MEDIA TABLE

BACKGROUND

This patent application is a Continuation of U.S. application Ser. No. 15/351,129, filed Nov. 14, 2016, entitled "APPARATUS, SYSTEMS AND METHODS FOR CONTROLLING PRESENTATION OF CONTENT USING A MULTI-MEDIA TABLE," and granted as U.S. Pat. No. 10,382,806 on Aug. 13, 2019, the contents of which is herein incorporated by reference in its entirety.

BACKGROUND

Recent developments in touch-sensitive display technologies has facilitated the emergence of a variety of new media presentation technologies. One newly emerging touch-sensitive display device is the multi-media table. The multi-media table is a table that has a working surface with a visible touch-sensitive display, also known as a touchscreen. The visible touch-sensitive display is located below the working surface and is visible to the multi-media table users. Since the touch-sensitive display employs a touch-sensitive display technology, the user may interactively manipulate presentation of the graphics on the display by touching the work surface with their hands, a pen, or other instrument.

Since the touch-sensitive display is a type of computer system input device, that enables the user to interact directly with displayed graphics and to control various applications that are running on the multi-media table controller. The multi-media table controller is similar to a personal computer, smart phone, or other electronic device in that the user is able to perform various computer related functions using their multi-media table. The touch-sensitive display visually outputs information pertaining to executing applications, much like the visual output display information that is presented on a computer screen or on the display of a smart phone. Accordingly, the touch-sensitive display provides a user interface that may be used to control the multi-media table controller, and thus permit the user to operate a variety of computer implemented applications that perform various functions.

In addition, the multi-media table may also be configured to present media content on the touch-sensitive display. Media content is typically provided as a media content event, much like the media content events that are presented on a television or the like. A media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

Since the display area of a touch-sensitive display of a multi-media table can be relatively large, the multi-media table controller can be configured to concurrently present display output from one or more executing applications and present one or more media content events. For example, a first portion of the touch-sensitive display may be used to control operation of a particular executing application, such as a computer-aided design or computer-aided drafting (CAD) application that permits the operator to view and manipulate graphic representations of physical objects. Concurrently, another portion of the touch-sensitive display may be used to present a particular media content event of interest, such as the presentation of a sporting event, such as a football game. Here, the user may continue work on a particular project using the executing CAD application while viewing the football game. As another illustrative example, the multi-media table may be located at a residence, and from time to time, serve as a dining table. The user could browse the internet using a first portion of the touch-sensitive display and concurrently view (and optionally listen to) a broadcasting news report that is being presented on a different portion of the touch-sensitive display.

However, to display a broadcasting media content event on a portion of the touch-sensitive display, the multi-media table controller must have access to a stream of media content. In some instances, the multi-media table controller may be configured to receive and process broadcasting streams of media content, much like the well known set top box.

Alternatively, or additionally, the multi-media table controller may be communicatively coupled to a set top box or other media device so as to receive the streaming media content event directly from the set top box or other media device. Here, the user must first operate their set top box or other media device to access and process a particular media content event of interest, and then cause the set top box or other media device to communicate the streaming media content event to the multi-media table controller. In this operating configuration, the two step process of configuring the set top box or other media device and configuring their multi-media table to display the received media content event is a relatively cumbersome and time consuming exercise on the part of the user.

Accordingly, there is a need in the art to facilitate a more convenient and user-friendly way of concurrently controlling operation of a multi-media table that is presenting a media content event on a portion of its touch-sensitive display and controlling operation of a set top box or other media device that is providing the streaming media content event to the multi-media table.

SUMMARY

Systems and methods of controlling content presentation on a touch-sensitive display of a multi-media table that is communicatively coupled to a media device that is operable to access the media content. An exemplary embodiment receives, at the multi-media table from the media device, a media content event; presents the media content event on a portion of the touch-sensitive display of the multi-media table; detects a gesture-based touch movement made by a user on the touch-sensitive display; determines an intended user command based on the detected gesture-based touch movement; generates a media device command when the intended user command is configured to control presentation of the media content event; and communicates the generated media device command from the multi-media table to the media device, wherein the media device controls the media content event in accordance with the received media device command.

BRIEF DESCRIPTION OF THE DRAWINGS

Preferred and alternative embodiments are described in detail below with reference to the following drawings.

DETAILED DESCRIPTION

Figure 1:
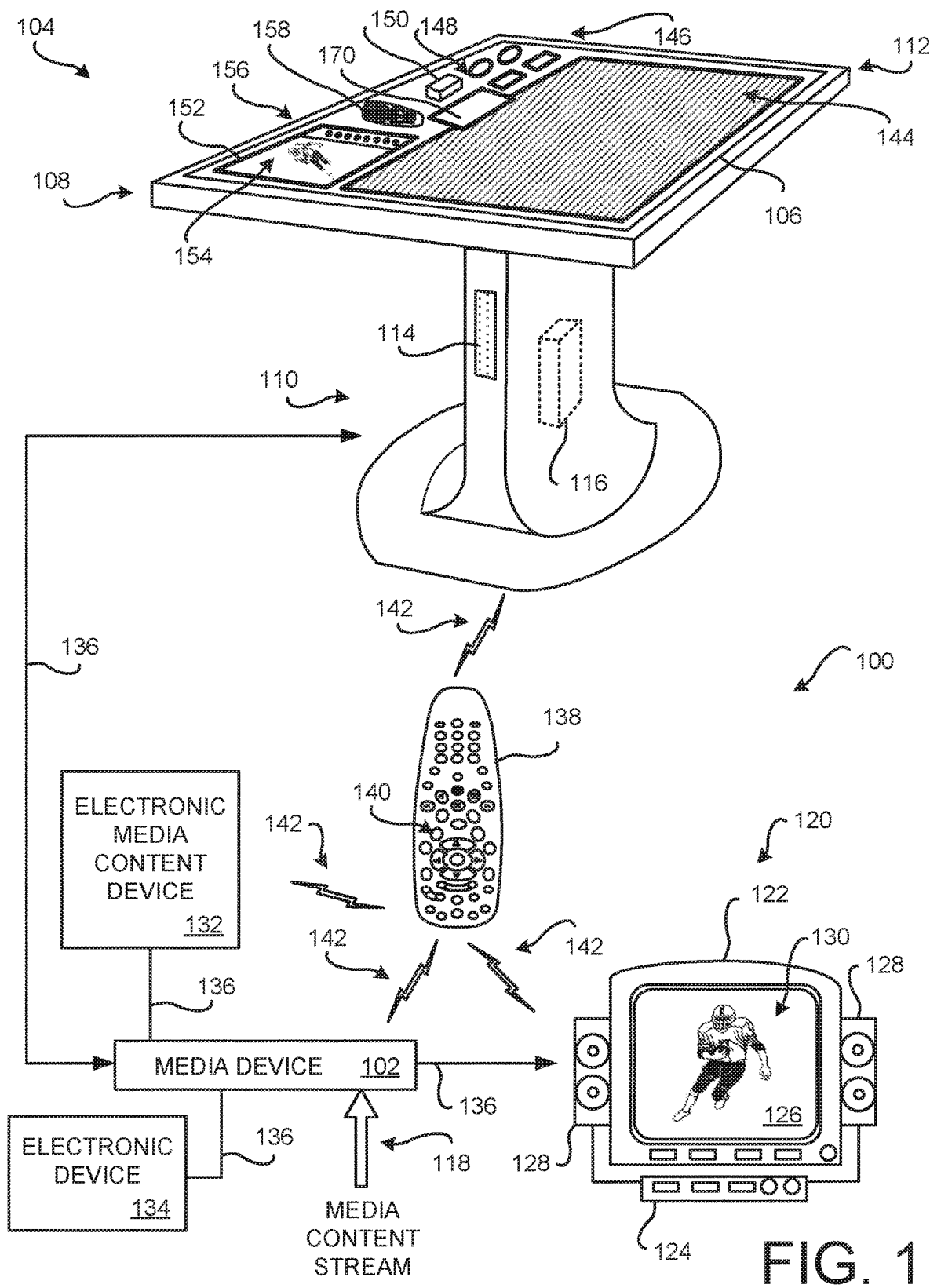
FIG. 1 is a block diagram of an embodiment of a multi-media table interface system that depicts a block diagram of a media device and a perspective view of a multi-media table.

FIG. 1 is a block diagram of an embodiment of a multi-media table interface system 100 that depicts a block diagram of a media device 102 and a perspective view of a multi-media table 104. In an exemplary embodiment, the user of the multi-media table 104 is able to control the media device 102 by operation of the touch-sensitive display 106 of the multi-media table 104.

An exemplary embodiment of the multi-media table 104 comprises a body portion 108 and an optional pedestal portion 110. The body portion 108 comprises the substantially horizontally oriented touch-sensitive display 106 and a working surface 112. The working surface 112 preferably includes a surface portion that is transparent that overlays the touch-sensitive display 106 (which in some embodiments may itself be part of the touch-sensitive display 106). Preferably, the top of the working surface 112 is rigid and sufficiently durable so that the user may place objects on the working surface 112 without scratching or otherwise damaging the working surface 112, and in particular, the transparent portion that overlays the touch-sensitive display 106. Further, the working surface 112 is preferably resistant to various chemicals and cleaning devices that may be used to clean the working surface 112 from time to time.

The touch-sensitive display 106 is embedded within and/or is an internal component of the body portion 108. The transparent portion of the working surface 112 that is over the top surface of the touch-sensitive display 106 is configured to permit touch-based control of the touch-sensitive display 106 by the user. Various embodiments of the touch-sensitive display 106 may employ any known or later developed touch-sensitive display technology. Such touch-sensitive display technologies include, but are not limited to, a resistive touchscreen panel technology, a surface acoustic wave (SAW) technology, a capacitive touchscreen panel technology, a surface capacitance technology, a projected capacitance technology, a mutual capacitance technology, a self-capacitance technology, an infrared grid technology, an optical imaging technology, a dispersive signal technology, and an acoustic pulse recognition technology. A touch-sensitive display 106 may be sensitive to the touch of the user's fingers. Alternatively, or additionally, the touch-sensitive display 106 may be sensitive to contact by an object, such as a stylus, pen, or the like. In some embodiments, the transparent portion of the working surface 112 may be integrated with and/or may be a component of the touch-sensitive display 106.

In this example embodiment, pedestal portion 110 of the multi-media table 104 supports the body portion 108 (which may optionally provide at least some degree of axial rotation of the touch-sensitive display 106). Other embodiments may use other types of support devices to support the touch-sensitive display 106 in a substantially horizontal orientation, such as a plurality of legs or the like (similar to supports used by dinner tables or coffee tables). In some embodiments, the body portion 108 with the touch-sensitive display 106 may be detachable from the pedestal portion 110. Alternatively, the pedestal portion 110 may be omitted in some embodiments so as to be able to be placed on a conventional table top or other work surface, or even to be held by the user. Alternatively, or additionally, the pedestal portion 110 may be configured to hold the body portion 108 with the touch-sensitive display 106 in a vertical or in a substantially vertical orientation. If the touch-sensitive display 106 is used in the vertical orientation, the pedestal portion 110 may be replaced with other structure that facilitates placement of the body portion 108 on a wall or for suspension of the body portion 108 from a ceiling or other overhead structure. Any such forms of support structure to secure and orient the touch-sensitive display 106 are contemplated to be within the scope of this disclosure since the support and/or orientation of the touch-sensitive display 106 during use is not particularly relevant to the function and operation of the various embodiments of the present invention.

The pedestal portion 110 optionally includes one or more speakers 114 and a multi-media table controller 116. In some embodiments, one or more of the speakers 114 and/or the multi-media table controller 116 may be separate components that are communicatively connected to the multi-media table 104, and/or may be components of the touch-sensitive display 106.

The speaker 114 outputs audio content of interest that is selected for output by the user. Since the touch-sensitive display 106 is operable to present visual output from a plurality of operating applications and/or from one or more presented media content events, the multi-media table controller 116 is configured to receive specification from the user as to which particular audio output content is to be reproduced as audible sounds by the speakers 114. Further, the multi-media table controller 116 is configured to receive specifications from the user that controls the volume level (volume up/volume down) of the audio content being output from the speakers 114.

The exemplary media device 102 is configured to manage presentation of media content, and in particular, broadcasting media content events. Example media devices 102 include, but are not limited to, a set top boxes (STBs), stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 118.

The media content stream 118 includes a series of media content events. Typically, a media content event presents theme-based visual and audio content to a user for their enjoyment and/or for informative purposes. Examples of such theme-based content include movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In a broadcast environment, the media content event is broadcast to a plurality of media devices 102 as a stream of media content residing in the media content stream 118. Typically, at any given instant in time, the media device 102 may be receiving hundreds of, or even thousands of, concurrently broadcasting media content streams each with one or more streaming media content events. Typically, presentation of a media content event occurs over some time span (duration). Thus, the media content event has a beginning portion that usually includes identifying information about the media content event, such as music, text of a title, or other information. When the user views this beginning portion of the media content event, the user intuitively understands that they are viewing the beginning of the media content event.

As time progresses, the entirety of the streaming media content event of interest is presented to the user as the stream of media content is being received in the media content stream 118. At some point, the media content event of interest comes to its end (conclusion). A viewing user intuitively understands that the media content event of interest is ending upon viewing the concluding portion of the media content event. Such concluding portions of the media content event typically include the closing credits portion, wherein the closing credits are visible to the user. Typically, when the user is viewing a live broadcast of the media content event, a next media content event begins after the conclusion of the media content event of interest. Alternatively, one or more commercials or the like may next be presented to the user prior to the initial presentation of the next live broadcast media content event (assuming that the user chooses to view that next media content event).

The exemplary media device 102 is communicatively coupled to a media presentation system 120 that includes a visual display device 122, such as a television (hereafter, generically a TV), and an audio presentation device 124, such as a surround sound receiver controlling an audio reproduction device. The video portion of the media content event is presented to a user on a display 126 of the visual presentation device 122. The audio portion of the media content is reproduced as audible sounds by one or more speakers 128 of the audio presentation device 124. Other types of output devices may also be coupled to the media device 102, including those providing any sort of stimuli sensible by a human being, such as temperature, vibration and the like. In some embodiments, the media device 102 and one or more of the components of the media presentation system 120 may be integrated into a single electronic device.

A media content event comprises a video stream portion, a corresponding audio stream portion, an optional corresponding metadata stream portion, an optional closed caption stream portion, and other optional streaming information of interest. For example, the media content stream 118 may, from time to time, include electronic program guide (EPG) information that is stored by the media device 102.

The video stream portion is comprised of a plurality of serially sequenced video frames. Each video frame has data or information used by the media device 102 to render and present a particular image of a media content event of interest. The video frames are serially presented so as to create a moving picture. For example, an image 130 of a football player filmed during a football game is conceptually illustrated as being presented on the display 126. Thus, one skilled in the art appreciates that the conceptual media content event of interest that has been selected for presentation by the user of the media device 102 may be a football game.

The audio stream portion may include spoken words (dialogue), music, and/or background sounds. Presentation of the audible sounds from audio stream portion is sequenced with presentation of the video frames of the video portion of the media content stream 118 such that spoken words, music, and background sounds of the audio stream portion correspond in time with the moving picture. For the exemplary football player performing in the football game, the audio portion may include dialogue of one or more commentators discussing the game play and/or background environment noise, such as a cheering crowd.

The media device 102 may alternatively, or additionally, receive a media content stream 118 from an alternative source, such as an electronic media content device 132. The electronic media content device 132 is operable to access a media content event of interest from a suitable storage medium. Exemplary electronic media content devices 132, include, but are not limited to, digital video disc (DVD) players, gaming devices, flash memory devices, or the like.

Some media devices 102 are configured to receive information from and/or to control one or more electronic devices 134 that are communicatively coupled to the media device 102. Example electronic devices 134 include, but are not limited to, home appliances, security systems, video cameras, or other devices. The electronic devices 134 may be in the vicinity of, or even remote from, the media device 102.

The components of the media presentation system 120, the electronic media content device 132, and/or the electronic device 134 are communicatively coupled to the media device 102 using any suitable communication link 136. The communication link 136 may be a suitable wire based connector, such as, but not limited to a coaxial cable, a high definition multimedia interface (HDMI) connector, a uniform serial bus (USB) connector, a plurality of wires, or the like. The communication link 136 may employ a wireless signal, such as an infrared (IR) signal or a radio frequency (RF) signal. Some communication links 136 may utilize a mating slidable type of connector, such as used by a uniform serial bus (USB) connector of a memory stick or the like. The communication links 136 may provide for single direction communications or bidirectional communications. Any known or later developed communication links 136 are contemplated by the various embodiments of the multimedia table interface system 100.

The exemplary media device 102 is configured to receive commands from a user via a remote control 138. The remote control 138 includes one or more controllers 140 disposed on the surface of the remote control 138. The user, by actuating one or more of the controllers 140, causes the remote control 138 to generate and transmit commands, via a wireless signal 142, to the media device 102 or to other devices, such as components of the media presentation system 120, the electronic media content device 132, and/or the electronic device 134. Preferably, each individual one of the controllers 140 has a specific predefined function that causes a specific operation by the media device 102, components of the media presentation system 120, the electronic media content device 132, and/or the electronic device 134. The commands communicated from the remote control 138 then control the media device 102, components of the media presentation system 120, the electronic media content device 132, and/or the electronic device 134. The wireless signal 142 may be an IR signal or a RF signal that is detectable by the media device 102, components of the media presentation system 120, the electronic media content device 132, and/or the electronic device 134.

In a preferred operating environment, the media device 102 is in proximity to, or at least relatively nearby, the multi-media table 104. For example, if the multi-media table 104 is in the user's residence, the media device 102 may be in the same room or another room of the user's residence. However, the media device 102 may be remotely located from the multi-media table 104, such as in other rooms of the residence, or even in another building, an office in a remote office building, or even farther away if the media device 102 is a mobile electronic device.

FIG. 1 conceptually illustrates a hypothetical operating scenario of the multi-media table 104 to further explain operation of embodiments of the multi-media table interface system 100. The touch-sensitive display 106 is conceptually illustrated as presenting an application output graphics region 144 of the touch-sensitive display 106 that is presenting graphical output from an executing application. For convenience, the graphical output of the executing application presented in the application output graphics region 144 is illustrated with a lined fill pattern. One skilled in the art appreciates that any suitable graphical information may be shown in the application output graphics region 144 to represent the graphical output of the executing application that is being run by the multi-media table controller 116. The presented graphical information may be textual information, tables, charts, diagrams, video clips, still images, and/or the like. Further, if audio information associated with the executing application is available, such audio information may be optionally output from the speakers 114 based on a specification by the user. Further, one skilled in the art appreciates that the multi-media table controller 116 may be concurrently executing a plurality of applications, wherein each application may be presenting graphical output on the application output graphics region 144 (or another portion) of the touch-sensitive display 106.

To further conceptually illustrate an operating scenario, an application interface region 146 is illustrated with graphical icons 148 thereon. The graphical icons 148 are each uniquely associated with a particular application that the user may select for operation by the multi-media table 104. Here, the individual graphical icons 148 are presented with unique visible attributes that intuitively inform the user of the particular associated application. For example one of the graphical icons 148 may be a well-known symbol or the like that is known to be associated with a CAD program that can be selected for execution by the multi-media table controller 116. In response to the user's "touching" of that graphical icon 148, the associated CAD program is retrieved and operation of the CAD program is initiated.

When operation of the multi-media table 104 is initiated (when the user "turns on" or powers up the multi-media table 104), only the plurality of graphical icons 148 may be initially presented on the touch-sensitive display 106 (assuming that operation of any of the available applications has not yet been initiated). In response to the user selecting one of the graphical icons 148, one skilled in the art appreciates that the multi-media table controller 116 begins to execute the application corresponding to the selected graphical icon 148. The multi-media table controller 116 then begins to generate the application output graphics region 144 that presents the graphical output that is then being generated by the selected application. Here, the example embodiment may also optionally shift, move, or otherwise relocate the plurality of graphical icons 148 to the application interface region 146 of the touch-sensitive display 106. Additionally, the size of the graphical icons 148 may be reduced so that they may all be fit within the designated region of the application interface region 146. Thus, the user will be able to operate the executing application via the presenting graphical output of the application, and still be able to view the graphical icons 148. Here, the user intuitively understands that they can additionally or alternatively select one of the associated applications for execution by the multi-media table controller 116 by "touching" the associated one of the graphical icons 148 shown in the application interface region 146.

More specific to embodiments of the multi-media table interface system 100, a particular graphical icon 150 may be presented in the application interface region 146 that is associated with the media device 102. Here, the graphical icon 150 corresponds to the media device 102. Depending upon the embodiment, the graphical icon 150 may be based on a photographic image or a pictorial representation of the actual media device 102 that is available for use by the user. Any suitable representation, such as a well-known icon, trademark, or the like, may be used for the graphical icon 150 so that the user intuitively understands that if they "touch" that particular graphical icon 150, then operation of embodiments of the multi-media table interface system 100 will be initiated.

In the various embodiments, a suitable communication link 136 (interchangeably referred to herein as the coupling means 136) is used to communicatively couple the media device 102 and the multi-media table 104. The communication link 136 may be wire based or may employ a wireless technology. Further, the communication link 136 supports bidirectional communication between the media device 102 and the multi-media table 104. That is, the media device 102 may communicate media content, information and/or media device commands (instructions) to the multi-media table 104. Conversely, the multi-media table 104 may communicate information and/or command instructions to the media device 102. The media device commands may be configured to control operation of the media device 102 and/or to control components of the media presentation system 120.

Assuming that the user has previously "touched" the graphical icon 150, thereby causing the multi-media table controller 116 to access and execute interface logic that enables communications between the media device 102 and the multi-media table controller 116, the multi-media table controller 116 configures the multi-media table interface system 100 to present a media device display region 152 on the touch-sensitive display 106. In an example embodiment, a graphical representation of the media device 102 may be presented on the touch-sensitive display 106, wherein active regions on the graphical image of the media device 102 correspond to physical controls of the media device 102. Thus, the user may select to operate the media device 102 by "touching" the corresponding active areas on the image of the media device 102 presented on the touch-sensitive display 106.

The media device display region 152 presents graphical information provided by the media device 102. Examples of graphical information provided by the media device include the video portion of a media content event, an electronic program guide (EPG), closed captioning text, or other control graphics such as popup pages, selection menus, or the like used to manage operation of the media device 102 and/or components of the media presentation system 120. When a media content event is being presented in the media device display region 152, the media device 102 is communicating at least the video portion of the presenting media content event to the multi-media table 104 so that the video portion is presented on the media device display region 152 on the touch-sensitive display 106. Additionally, or alternatively, the audio portion, closed captioning text information, and/or metadata of the media content event may be communicated to the multi-media table 104. The closed captioning text information, and/or metadata may be optionally presented to the user by the multi-media table 104 at the user's discretion.

To conceptually illustrate this hypothetical operating scenario of presenting a media content event, the media device 102 is understood by one skilled in the art to be optionally configured to communicate the same media content event to the media presentation system 120, wherein the video portion is presented on the display 126 of the media presentation system 120. In accordance with the above-described hypothetical example of the presenting football game, the image of the football player 130 is also presented as the image 154 that is being presented in the media device display region 152 of the touch-sensitive display 106. Thus, one skilled in the art appreciates that the user may view the same video content that is being processed by the media device 102 for presentation by the media presentation system 120.

However, one skilled in the art appreciates that alternative media content may be alternatively provided by the media device 102 that is presented by the media presentation system 120. For example, media content events from a first channel may be communicated to the multi-media table 104 and a different media content event may be communicated to the components of the media presentation system 120. Or, no media content may be communicated from the media device 102 to the media presentation system 120, and/or one or more components of the media presentation system 120 may be powered down (turned off), which media content is being communicated to the multi-media table 104 for presentation in the media device display region 152.

Also, the user may optionally control the multi-media table 104 so that the audio content associated with the media content event received from the media device 102 is output from the speakers 114 of the multi-media table 104. For example, the user may hear the football game commentary while watching the football game that is being presented in the media device display region 152 of the touch-sensitive display 106. Alternatively, the user may choose to play music being provided by the media device 102 or another electronic device, may choose to hear the audio content being output by an executing application, or may choose to hear no audio output. The user provides their audio content presentation selections via the touch-sensitive display 106 or through another suitable user interface device.

However, embodiments of the multi-media table interface system 100 provide various advancements to the state of the arts since the communication link 136 supports bidirectional communications between the media device 102 and the multi-media table 104. More particularly, the user is able to control operation of the media device 102 using the graphical interface provided by the touch-sensitive display 106 of the multi-media table 104. In an example, embodiment, a plurality of media device content control graphical icons 156 are shown adjacent to or on the media device display region 152 on the touch-sensitive display 106. Each of the content control graphical icons 156 are associated with a particular function that controls operation of the media device 102, such as a trick function operation or another control operation. That is, the content control graphical icons 156 are configured to provide touch sensitive remote control operation of the media device 102 to the user via the touch-sensitive display 106. Furthermore, the user may also be able to control operation, via the media device 102, of one or more of the components of the media presentation system 120, the electronic media content device 132, and/or the electronic device 134 using the content control graphical icons 156 that have been associated with particular operating functions of those devices. Additionally, or alternatively, the user may be able to control operation of the multi-media table 104 via their media device 102.

Some embodiments of the multi-media table interface system 100 are configured under a first operational configuration wherein the multi-media table controller 116 controls presentation of all graphical content that is being presented on the touch-sensitive display 106. Other embodiments of the multi-media table interface system 100 are configured under a second operational configuration that enables shared control of the presentation of graphical content on the touch-sensitive display 106 by both the media device 102 and the multi-media table controller 116. Under the second operational configuration, a portion of the touch-sensitive display 106 is under the direct control of the multi-media table controller 116, such as when output graphics of an executing application are presented on the touch-sensitive display 106. Another portion of the touch-sensitive display 106 is under the direct control of the media device 102.

Under this first operational configuration, selected embodiments of the multi-media table interface system 100 communicatively couple the media device 102 to the multi-media table controller 116 such that the multi-media table controller 116 receives and processes the received media content. Here, the multi-media table controller 116 receives a stream of media content from the media device 102 (video and/or audio content of a media content event). The format of the data of the received media content stream may be different from the format of graphical information that is provided to the touch-sensitive display 106. That is, the multi-media table controller 116 processes the received media content (concurrently with operation of any executing applications) into a video or graphical data format that is presentable on the touch-sensitive display 106.

Under this first operational configuration, in the event that the user wishes to provide some type of user input to control presentation of the media content received from the media device 102, the user "touches" the touch-sensitive display 106. The multi-media table controller 116 detects the user's touch type input, which may be a gesture made by the user's fingers while touching the working surface 112. Any suitable type of gesture-based touch movement may be used by the various embodiments for enabling the user to generate an intended user command. The multi-media table controller 116 then interprets the sensed gesture-based touch movement to define or otherwise determine an intended user command. If the determined intended user command is intended to control operation of the multi-media table 104 or one of the executing applications, the multi-media table 104 may perform operations as necessary to implement the user's command.

However, in the first operational configuration, if the intended user command relates to presentation of the media content received from the media device 102, then the multi-media table controller 116 will determine if the multi-media table controller 116 is able to implement the determined intended user command, or determine if information corresponding to the determined intended user command must be sent to the media device 102 such that the media device 102 implements the intended user command.

For example, in some operating situations, the user may wish to change the size of the media device display region 152 of the touch-sensitive display 106 that is being used to present the media content received from the media device 102. For example, the user may be currently working with a particular work application (with its graphical output being presented in the application output graphics region 144 that occupies a relatively large portion of the touch-sensitive display 106). Concurrently, the user may be casually monitoring the progress of the football game being presented in the image 154 that is being presented in the media device display region 152 on the touch-sensitive display 106 that uses a relatively small area.

At some point in time, the user may become interested in viewing a larger image of the football game. The user may, using a suitable gesture-based touch movement, optionally initiate a first user command to pause operation of the running application. This first user command may be implemented by the multi-media table controller 116 since the first user command is not related to presentation of the media content received from the media device 102. That is, this first user command to pause operation of the executing application may be implemented without sending information pertaining to this first user command to the media device 102.

In some embodiments, the media content event being displayed in the media device display region 152 of the touch-sensitive display 106 may be presented over some or all of the application output graphics region 144 using a picture in picture, picture over picture, or the like format such that the media content event being provided by the media device 102 to the display 126 may be more readily viewed on the touch-sensitive display 106. This feature may be particularly advantageous if the user is initially viewing a relatively small area of display for the media device display region 152, and then later increases the area of the media device display region 152 for enlarged viewing. Alternatively, or additionally, some or all of the application output graphics region 144 may be presented over all of, or a portion of, the media device display region 152 where the user may simply page back and forth to view the application output graphics region 144 and/or the multi-media table controller 116.

The user may then make another suitable gesture-based touch movement that is intended to increase the size of the media device display region 152 of the touch-sensitive display 106 that is being used for presentation of the media content received from the media device 102. Since the media content being received from the media device 102 is itself not modified, the multi-media table controller 116 can implement this second user command by adjusting the size of the media device display region 152. That is, one skilled in the art understands that the multi-media table controller 116 is able to enlarge the image of the received media content without having the media device 102 make any adjustments of the communicated media content. Here, no information pertaining to this second user command is communicated from the multi-media table controller 116 to the media device 102.

Further, the user may wish to change the audio output from the executing application (or another application) to the audio output of the media content event being received from the media device 102. Based on another detected gesture-based touch movement, the multi-media table controller 116 can then direct the audio content of the received media content event to the speaker 114. Here, one skilled in the art understand that the multi-media table controller 116 is simply controlling audio content that is to be output from the speaker 114, and therefore, that no information pertaining to this second user command needs to be communicated from the multi-media table controller 116 to the media device 102 (since the audio portion of the media content event is already being communicated from the media device 102 to the multi-media table 104).

Also, the user may wish to increase (or lower) the volume level of the audio content of the received media content event by inputting a suitable gesture-based command. Under this first operational configuration, one skilled in the art appreciates that there are two possible ways to adjust audio content volume output. First, the multi-media table controller 116 may directly control the audio content volume output from the speaker 114 by controlling an internal audio amplifier (not shown) that is providing output to the speaker 114. In this first situation, the multi-media table controller 116 can then directly adjust the volume output of the presented audio content that is being output from the speaker 114 by controlling operation of the audio amplifier. Here, no information pertaining to this volume level adjustment user command is communicated from the multi-media table controller 116 to the media device 102.

Alternatively, the audio portion of the media content event being output from the media device 102 may be modified, thereby resulting in a volume level change when output from the speaker 114. In this second situation, the volume level change may be implemented by the media device 102 (rather than by the multi-media table controller 116). Here, the multi-media table controller 116 generates a suitable media device command which is then communicated to the media device 102. The media device 102, in response to receiving the media device command, then makes the appropriate adjustment of the volume level of the audio content portion that is being communicated to the multi-media table 104. Once the volume level adjustment has been implemented by the media device 102, the multi-media table controller 116 receives the adjusted audio content from the media device 102 so that the user's volume adjustment command is implemented.

It is appreciated by one skilled in the art that the above-described audio content volume level change implemented by the media device 102 can be performed in a real time, or near real time, basis. For example, a graphical icon resembling a slider bar type or dial type volume controller may be graphically presented somewhere on the touch-sensitive display 106. The user could touch/slide/rotate the graphical audio content volume controller, and then hear the volume level adjustment as it is being made by the media device 102. Here, the user will perceive that the touch-sensitive display 106 is controlling the media device 102 in real time, or at least in near real time, since the user will hear their gesture-based volume adjustment being made in real time, or at least in near real time.

Some embodiments of the multi-media table interface system 100 may be configured using a second operational configuration wherein the media device 102 directly controls a region of the touch-sensitive display 106 and the multi-media table controller 116 concurrently controls a second region of the touch-sensitive display 106. Under the second operational configuration, information corresponding to the user's sensed gesture-based touch movement on the associated region of the touch-sensitive display 106 is communicated directly to the media device 102. The media device 102 is configured to determine the user's intended operating commands based on the sensed gesture-based touch movements made by the user on that particular region of the touch-sensitive display 106 that is under the control of the media device 102. Similarly, the multi-media table controller 116 is configured to determine the user's intended operating commands based on the sensed gesture-based touch movements made by the user on that particular region of the touch-sensitive display 106 that is under the control of the multi-media table controller 116.

Under the second operational configuration, the regions may be predefined. Thus, one region is under the control of the media device 102, and the other region is under the control of the multi-media table controller 116. In some embodiments, the regions may be dynamically adjusted by the user by inputting suitable gesture-based touch movements. For example, a conventional touch and drag gesture made to an edge of a region or a corner of the region of interest may be used to adjust the size of that region. In some embodiments, if the media device 102 is not communicating information to the multi-media table 104, the entirety of the area of the touch-sensitive display 106 may be under the control of the multi-media table controller 116 until the media device 102 begins to provide information to the multi-media table 104. Conversely, if the multi-media table controller 116 is not operating, the entirety of the area of the touch-sensitive display 106 may be under the control of the media device 102 until the multi-media table controller 116 begins to provide information to the touch-sensitive display 106.

Under either operational configuration, it is appreciated that the speakers 128 of the media presentation system 120 may also be outputting the audio content of the media content event, or alternatively, may have been placed into a mute mode so that the speakers 128 are not presenting any sound (thereby avoiding or mitigating any distractions to the user at the multi-media table 104 who may be more interested in listening to the audio output of the executing application). Accordingly, the volume level change may be implemented by the media device 102 (rather than by the multi-media table controller 116) at the speakers 128 based on audio content volume control commands input by the user via the touch-sensitive display 106. In such situations, a suitable graphical input controller may be presented on the touch-sensitive display 106 that is intuitively understood by the user to control the audio content volume output of the speakers 128. Under the first operational configuration, based on a determined intended user command to operate audio content volume output at the speakers 128 (based on a corresponding gesture-based touch movement made by the user), the multi-media table controller 116 generates a suitable media device command which is then communicated to the media device 102. Under the second operational configuration, information corresponding to the user's sensed gesture-based touch movement is communicated directly to the media device 102. In response to receiving the media device command (under the first operational configuration) or information corresponding to the sensed gesture-based touch movement (under the second operational configuration), the media device 102 then makes the appropriate audio content volume level adjustment to the audio content portion that is being presented from the speakers 128 in accordance with the user's intended volume adjustment command that was input on the touch-sensitive display 106.

One skilled in the art is familiar with a variety of video content presentation control functions, interchangeably referred to herein as trick functions, that may be performed by the media device 102. When the user is viewing a presented media content event on the display 126 of the media presentation system 120, the user is able to implement trick function operations by actuating one or more of the controllers 140 on their remote control 138. The media device 102, in response to receiving the wireless signal 142 (having the remote control generated command instructions therein) from the remote control 138, implements the trick function that has been requested by the user.

Non limiting example trick functions include the pause operation, the fast forward operation, the fast rewind (reverse) operation, the low motion forward operation, the slow motion reverse operation, the jump forward operation, and/or the jump backward operation. The various trick functions are configured to adjust the presentation speed of the video portion of the media content event and/or adjust the direction of presentation of the video portion of the media content event. The pause trick function pauses presentation of the video portion of the media content event (by continuously presenting a single image frame of the video content). The fast forward trick function increases the rate or presentation of the video portion of the media content event (so that the video appears to run forward at a relatively high rate of speed in the "forward" direction). The slow motion forward trick function slows presentation of the video portion of the media content event (so that the video appears to run forward at a relatively slow or low rate of speed in the forward direction). The fast rewind trick function reverses presentation of the video portion of the media content event (so that the video appears to run backward at a relatively high rate of speed in the "reverse" direction). The slow motion rewind trick function reverses presentation of the video portion of the media content event (so that the video appears to run backward at a relatively slow rate of speed in the reverse direction). These trick functions may be referred to using other equivalent nomenclature by other media content presentation systems.

When the user is at the multi-media table 104, embodiments of the multi-media table interface system 100 are configured to permit the user to control the media device 102 using the plurality of content control graphical icons 156. Accordingly, the user is able to perform trick function operations to the presented media content event shown in the media device display region 152 on the touch-sensitive display 106 by inputting suitable gesture-based touch movements via content control graphical icons 156 that are presented on the touch-sensitive display 106. In practice, the plurality of graphical icons 148 may be presented on the touch-sensitive display 106 in proximity to or on the media device display region 152, wherein each one of the presented content control graphical icons 156 are associated with a particular trick function operation. In some embodiments, the content control graphical icons 156 include descriptive text information the user of the associated trick function operation. Alternatively, or additionally, the content control graphical icons 156 may present graphical information that intuitively informs the user about the associated trick function operation. Thus, when the user "touches" a particular one of the content control graphical icons 156 associated with a trick function operation of interest, the media device 102 may control the media content event accordingly. Under the first operational configuration, the multi-media table 104 receives input for the touch-sensitive display 106 pertaining to the user's gesture-based touch movement. The multi-media table controller 116 then generates a corresponding media device command that is communicated to the media device 102 (wherein the communicated media device command includes information about the user's intended trick function operation of interest). Under the second operational configuration, information corresponding to the user's sensed gesture-based touch movement is communicated directly to the media device 102, wherein the media device 102 determines the user's intended trick function operation of interest. The media device 102, in response to receiving the media device command from the multi-media table 104, then performs the desired trick function operation. That is, the media content being communicated from the media device 102 to the multi-media table 104 is controlled in accordance with the desired trick function operation.

To conceptually describe operation of a pause operation, the user may initiate a pause of the video content being presented in the media device display region 152 on the touch-sensitive display 106 by "touching" one of the graphical icons 156 that are associated with the pause trick function operation. Under the first operational configuration, in response to sensing the gesture-based touch movement on or near the graphical icon 148 for a pause trick function operation, the multi-media table controller 116 generates a media device command that indicates that the video portion of the presenting media content event is to be paused. The media device command is then communicated from the multi-media table 104 to the media device 102. Under the second operational configuration, information corresponding to the user's sensed gesture-based touch movement to implement a pause operation is communicated directly to the media device 102. In response to receiving the media device command (or the sensed gesture-based touch movement information) associated with the pause trick function operation information, the media device 102 pauses presentation of the media content event that is being communicated to the multi-media table 104. (Here, the media device 102 communicates a stream of video content that is comprised of a single still image corresponding to the video frame that was being presented when the media device command was received at the media device 102). Thus, the user viewing the video portion of the media content event on the media device display region 152 on the touch-sensitive display 106 sees that the presentation of the media content event has been paused in the media device display region 152 on the touch-sensitive display 106.

Some embodiments of the media device 102 are configured to concurrently perform the same trick function operation on the media content event that is being communicated to the components of the media presentation system 120. For example, if the media content event is concurrently being presented on the display 126 when the media device command with the pause trick function operation instruction is received, then the pause is also concurrently performed on the media content being presented by the media presentation system 120.

However, other embodiments of the media device 102 may optionally perform the trick function operation instruction in the media device command (or the sensed gesture-based touch movement information) received from the multi-media table 104 only at the multi-media table 104. For example, if the media device command (or the sensed gesture-based touch movement information) received from the multi-media table 104 is for a pause trick function operation, the media device 102 may perform the pause operation on the media content event stream that is being communicated to the multi-media table 104, and not perform the pause trick function operation on the media content event being presented by the media presentation system 120. Here, the user would see a pause in presentation of the media content event in the media device display region 152 on the touch-sensitive display 106 while presentation continues on the display 126 of the media presentation system 120. One skilled in the art appreciates that the media device 102, to provide this particular operational flexibility, would have a specially configured content buffer and/or multiple content buffers.

Additionally, or alternatively, one of the content control graphical icons 156 may resemble an image of the remote control 138 (or a similar or generic remote control unit), referred to herein as a remote control emulating icon 158. The graphical image of the remote control emulating icon 158 may have a plurality of active areas (interchangeably referred to as active regions) corresponding to the controllers 140 of the physical remote control 138. Accordingly, the user intuitively knows which of the active areas of the remote control emulating icon 158 to touch to cause the media device 102 to operate in a manner that would be the same as when the user actuates the corresponding controller 140 on their physical remote control 138. For example, one of the active areas may resemble a remote control controller 140 with a "pause" symbol thereon, and may be represented in or close to the same location as the pause controller 140 of the physical remote control 138. Here, the user intuitively understands that if they touch the that particular active area on the remote control emulating icon 158, a pause operation will be initiated such that the media device pauses the presentation of the media content event being shown in the media device display region 152 on the touch-sensitive display 106.

In some embodiments, one of the content control graphical icons 156 may resemble a relatively small image of a generic remote control. In response to a touch selection by the user of the particular remote control emulating icon 158 associated with the remote control, the multi-media table controller 116 operates to cause presentation of a relatively larger graphical image of the remote control emulating icon 158 on the touch-sensitive display 106 that is sufficiently large so as to permit the user to discern the function of the various active regions (or active areas) and that permits touch control of individual active regions by the user. For example, one of the active regions on the remote control emulating icon 158 may be a volume controller graphic that resembles the volume control controller 140 on the physical remote control 138. Here, the size of the active region (show as an image of a graphical volume controller) would be sufficiently large such that the user would be able to discern and understand operation of the graphical volume controller. Also, the image of the graphical volume controller would be large enough so as to permit reliable and accurate detection of the user's touch when the user attempts to adjust the audio content volume via the image of the graphical volume controller that is being presented on the touch-sensitive display 106. Further, the user may optionally adjust the size of the image of the remote control emulating icon 158 using a suitable gesture-based touch movement on the touch-sensitive display 106.

Some embodiments may be configured to activate (turn on, or enter into a power on state) or deactivate (power off or enter into a power off state) the media device 102 via the touch-sensitive display 106. For example, one of the active areas of the remote control emulating icon 158 may correspond to a power on/off button (that also corresponds to a power on/off controller 140 on the physical remote control 138). The user may then activate the media device 102 and/or components of the media presentation system 120 by touching the active area associated with the power on/off active region that activates/deactivates the media device 102. Alternatively, or additionally, a different one of the content control graphical icons 156 and/or the graphical icons 148 may be associated with a power on/off function that activates/deactivates the media device 102 and/or components of the media presentation system 120.

Because the communication link 136 supports bidirectional communications between the media device 102 and the multi-media table 104, some embodiments may be optionally configured to cause the media device 102, in response to sensing an operation of a controller 140 of the physical remote control 138, to generate and communicate information pertaining to the actuated controller 140 to the multi-media table 104. The multi-media table controller 116 or the region directly controlled by the media device 102, in response to receiving this information, may operate to change presentation of the particular content control graphical icons 156 and/or active region on the remote control emulating icon 158. For example, if the pause button (the controller 140 associated with a pause operation) is actuated by the user or another person operating the physical remote control 138, the corresponding active region on the touch-sensitive display 106 may have its brightness intensity increased and/or the corresponding active region on the touch-sensitive display 106 may be made to appear flashing to visually indicate to a viewer of the touch-sensitive display 106 that the controller 140 of the physical remote control 138 has been actuated. Here, if the viewer sees a pause of the presentation of the media content event being shown in the media device display region 152 on the touch-sensitive display 106 and concurrently sees a brightening and/or flashing of a particular content control graphical icon 156 and/or an active region on the remote control emulating icon 158 associated with a pause operation, the viewer will quickly understand that the presentation of the media content event has been intentionally paused in response to an operation at the remote control 138 (and that there is not some sort of other operation event or a problem occurring at the media device 102 and/or at the multi-media table controller 116).

Conversely, some embodiments may be configured to cause the media device 102 to transmit information to the physical remote control 138 when an operation is initiated by the user via the touch-sensitive display 106. When the user provides a gesture-based touch movement intended to operate the media device 102 and/or components of the media presentation system 120, the media device 102 generates and communicates information to the remote control 138 such that the associated controller 140 on the remote control 138 visibly indicates which of its corresponding controllers 140 have been virtually operated from the multi-media table 104. For example, if the user operates a pause button shown on the active region of the graphical image of the remote control emulating icon 158, the media device 102 generates and communicates information indicating the initiation of the pause operation to the remote control 138. In response to receiving this information, the corresponding pause controller 140 lights up, illuminates with a higher intensity, illuminates with a flashing, and/or otherwise visually indicates actuation of the pause function by the user via the multi-media table 104.

In some embodiments, the user is able to disable/enable the remote control 138 using the touch-sensitive display 106 of the multi-media table 104. For example, the user may be in a first room or location using their multi-media table 104 while watching a media content event being presented in the media device display region 152 of the touch-sensitive display 106. The media device 102 and/or the corresponding physical remote control 138 may be in another room or location. The user may not want another person to be able to operate the media device 102 and/or components of the media presentation system 120 using the remote control 138 when the user is at their multi-media table 104. Accordingly, one of the remote control emulating icons 158, the content control graphical icons 156, and/or the graphical icons 148 may be configured to disable operation of the remote control 138 in response to receiving a user's gesture-based touch movement on that corresponding active area of the touch-sensitive display 106. After the user has disabled the remote control 138, a similar gesture-based touch movement by the user would then reactivate the remote control 138. This feature could be performed at the media device 102, which configures itself to disregard any detected wireless signals 142 emitted by the remote control 138 when disabled by the user of the multi-media table 104. Alternatively, or additionally, a disable command could be generated and communicated from the media device 102 (or even the multi-media table 104) in a wireless signal 142 that is received by the remote control 138. In response to receiving the disable command in the wireless signal 142, the remote control 138 then disables its operating functions and/or configures itself to not issue any wireless signals 142 until it is later re-enabled.

In some embodiments, the remote control 138 may be configured to associate one or more of its controllers 140 with commands that are configured to operate the multi-media table 104. When the user wishes to operate the multi-media table 104 using their remote control 138, the remote control 138 generates and issues a wireless signal 142 with command information that is configured to operate the multi-media table 104. If the media device 102 detects and receives the wireless signal 142, then the media device 102 may communicate suitable control instructions to the multi-media table controller 116 which then performs the desired operation. Alternatively, or additionally, the multi-media table 104 may detect the wireless signal 142 emitted from the remote control 138, and then operate accordingly. Some embodiments of a remote control 138 may be provisioned with special designated controllers 140 (not available on legacy remote controls) that are dedicated to operation of the multi-media table 104. The user intuitively understands that these controllers 140 are specifically configured to control of the multi-media table 104. Any suitable operating function of the multi-media table 104 may be configured for control using the remote control 138.

As another example, one of the content control graphical icons 156 or graphical icons 148 may be configured to cause presentation of a graphical image 170 of an EPG on the media device display region 152 on the touch-sensitive display 106. Here, before the graphical image 170 of the EPG is presented, the user "touches" the corresponding content control graphical icon 156 or graphical icon 148. The content control graphical icon 156 or graphical icon 148 may resemble a small EPG that the user intuitively understands will result in the presentation of the graphical image 170 of the EPG if touched. In response to the user touching the associated content control graphical icon 156 or graphical icon 148, the graphical image 170 of the EPG is then presented on a portion of the touch-sensitive display 106.

The graphical image 170 of the EPG comprises a plurality of active regions, wherein each active region of the graphical image 170 of the EPG uniquely indicates a presentation time and other information of interest of a broadcasting media content event that is receivable at the media device 102. Here, a received gesture-based touch movement is a user's touch on one of the active areas of the graphical image 170 of the EPG such that a generated media device command corresponds to the user's selection of a media content event that is indicated on the touched active area of the graphical image 170 of the EPG.

Alternatively, the graphical image 170 of the EPG may be presented in another portion of the touch-sensitive display 106, and optionally, concurrently with the presentation of media content in the media device display region 152. The EPG is a type of a user interface that presents a menu, or a series of menus, with a combination of text and symbols to represent media content event viewing choices that may be selected by the user. Typically, the EPG has the look and feel of a table with program information describing available media content events and/or channels that are currently being broadcast to the media device 102 in the available indicated channels. The information shown on the EPG may include the title of available media content events, along with the scheduled time and date of the media content event presentation (generically referred to herein as a presentation time). A brief description of the media content events may also be provided on the EPG. The EPG typically indicates the "channel" of the available media content event. The channel identifies the originating source of the program, such as a television studio, a premium movie provider, a national program provider, etc. Accordingly, the user of the multi-media table 104 is able to view the same EPG on the touch-sensitive display 106 that would be presented on the display 126. Alternative embodiments enable the user of the multi-media table 104 to navigate about the graphical image 170 of the EPG presented on the touch-sensitive display 106 separately from the viewer who may be navigating about another EPG that is being presented on the display 126.

The EPG presented on the display 126 is also interactive with the user. When viewing the EPG on the display 126 of the media presentation system 120, the user, via their remote control 138 that is in communication with a media device 102, is able to "scroll" or "navigate" about the EPG to select a media content event of interest and/or to select a particular channel of interest (thereby being presented the media content that is being currently broadcast on that selected channel). When the user highlights the portion of the EPG corresponding to a particular media content event of interest and/or a particular channel of interest, the user may actuate one or more controllers 140 of the remote control 138 to cause the media device 102 to perform a function relative to the selected media content event or channel of interest.

In an analogous manner, the user may use suitable gesture-based touch movements to navigate about the graphical image 170 of the EPG presented on the multi-media table 104, and then select a particular media content event of interest or a channel of interest by touching the corresponding area on the EPG being presented on the touch-sensitive display 106. In such an embodiment, the multi-media table controller 116 and/or the media device 102 has a prior knowledge of the function, spatial location, and relationship of each active area of the graphical image 170 of the EPG that is being shown on the touch-sensitive display 106. Based on the particular location of the user's touch, under the first operational configuration, the multi-media table controller 116 can then determine the identity of the particular media content event of interest or a channel of interest that the user intends to select. Then, the multi-media table controller 116 is able to generate a media device command that includes information that the media device 102 may use to access the desired media content event of interest or channel of interest that the user has selected via the EPG that is being presented on the touch-sensitive display 106. Under the second operational configuration, information corresponding to the user's sensed gesture-based touch movement is communicated directly to the media device 102 such that the media device 102 can determine the user's intended EPG selections therefrom.

Because the communication link 136 supports bidirectional communications between the media device 102 and the multi-media table 104, some embodiments may be optionally configured to cause the media device 102, in response to sensing a selection of a particular media content event or channel made via an EPG presented on the display 126, to generate and communicate information pertaining to the EPG selection to the multi-media table 104. The touch-sensitive display 106, in response to receiving this information, may operate to change presentation of the graphical image 170 of the EPG that is presented on the touch-sensitive display 106. For example, if a particular media content event has been highlighted on the EPG presented on the display 126 by the user operating the remote control 138, the corresponding region on the graphical image 170 of the EPG presented on the touch-sensitive display 106 may have its brightness intensity increased, shading or background color changed, and/or be made to appear flashing to visually indicate to a viewer of the touch-sensitive display 106 that a selection via the EPG presented on the display 126 has been made by the user. Here, if the viewer sees a change to a different media content event and/or channel from the presentation of the media content event currently being shown in the media device display region 152 on the touch-sensitive display 106 and also concurrently sees a brightening and/or flashing of the graphical image 170 of the EPG presented on the touch-sensitive display 106, the viewer will readily understand that the presentation to the new media content event and/or channel has been intentionally changed by the user or another person via the remote control 138 (and that there is not some sort of other operation event or a problem occurring at the media device 102 and/or at the multi-media table controller 116).

In some embodiments, one of the content control graphical icons 156 may resemble a small image of a generic EPG. In response to a touch selection by the user of the particular remote control emulating icon 158 associated with the EPG, a larger sized image of the graphical image 170 of the EPG is presented on the touch-sensitive display 106. The larger size image of the graphical image 170 of the EPG is sufficiently large for the user to discern the EPG information. Further, the size is large enough so as to permit reliable and accurate detection of the user's touch when the user attempts to select content via the graphical image 170 of the EPG that is being presented on the touch-sensitive display 106. Further, the user may optionally adjust the size of the graphical image 170 of the EPG using a suitable gesture-based touch movement on the touch-sensitive display 106.

With some embodiments, under the first operational configuration, the multi-media table controller 116 may generate a media device command with information that the user has initiated presentation of the graphical image 170 of the EPG on the touch-sensitive display 106. In response to receiving the media device command, the media device 102 may operate to present the corresponding EPG on the display 126 of the media presentation system 120. Further, as the user of the multi-media table 104 navigates about the graphical image 170 of the EPG shown on the touch-sensitive display 106, the multi-media table controller 116 provides a series of media device commands about the user's navigation activities such that the media device can show the corresponding navigation activities on the graphical image 170 of the EPG being presented on the display 126. Accordingly, another person viewing the EPG being presented on the display 126 will intuitively understand that the user of the multi-media table 104 is touching and navigation about the EPG being presented on the touch-sensitive display 106. Similarly, under the second operational configuration, information corresponding to the user's sensed gesture-based touch movement is communicated directly to the media device 102 so that the EPG may be presented and controlled in the same manner as the image of the graphical image 170 of the EPG that is being presented on the touch-sensitive display 106.

One skilled in the art appreciates that the user may use any suitable type of gesture-based touch movements that will cause the multi-media table controller 116 to move the media device display region 152, one or more of the content control graphical icons 156, and/or the optional remote control emulating icon 158 to any desired location on the touch-sensitive display 106. Further, other suitable types of gesture-based touch movements may be used to change the presented size of the media device display region 152, one or more of the content control graphical icons 156, and/or the optional remote control emulating icon 158 to any suitable dimensions that suite the particular desires of the user.

In some embodiments, the content being displayed on the touch-sensitive display 106 is communicated from the multi-media table 104 to the media device 102. Here, the media device 102 processes the received graphical and/or audio content, and then communicates the content to components of the media presentation system 120. For example, the graphical output of an executing application (under the control of the multi-media table controller 116) may be concurrently presented on the display 126 of the media presentation system 120. The viewer of the display 126 will then see the same graphical content that the user of the multi-media table 104 is viewing. Further, the same audio content that the user of the multi-media table 104 is hearing from the speaker 114 may be concurrently output from the speakers 128 of the media presentation system 120. In some embodiments, some or all of the graphical content being displayed on the touch-sensitive display 106 may be presented on the display 126 using a picture in picture, picture over picture, or the like format such that the media content event being provided by the media device 102 to the display 126 may be concurrently viewed with the graphical content being displayed on the touch-sensitive display 106.

Figure 2:
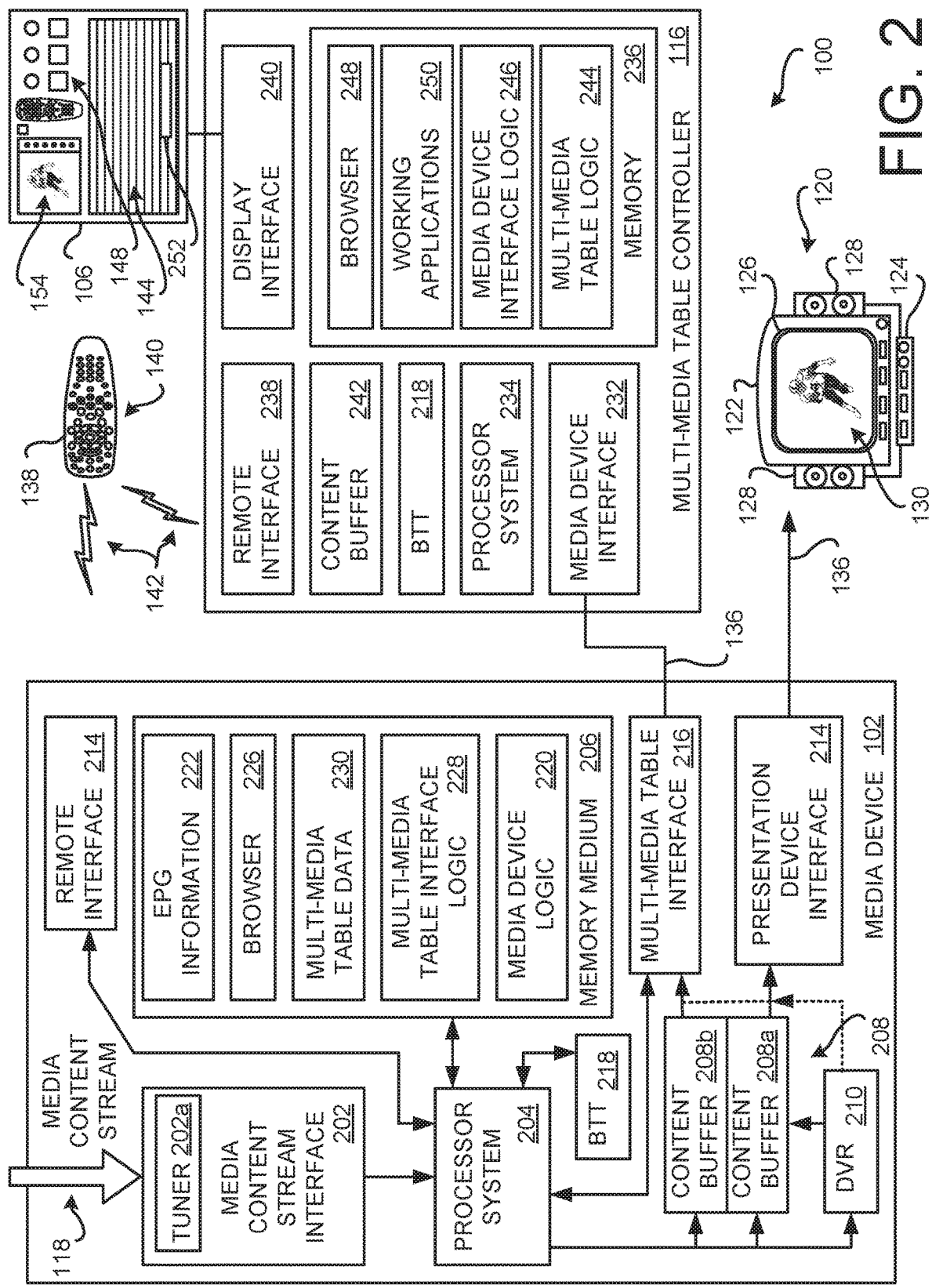
FIG. 2 is a block diagram of an embodiment of an example media device and an example multi-media table controller.

FIG. 2 is a block diagram of an embodiment of an example media device 102 and an example multi-media table controller 116 provisioned with embodiments of the multi-media table interface system 100. Embodiments of the media device 102 may be implemented in electronic media devices, such as, but not limited to, a set top box, a stereo, a television (TV), a digital video disc (DVD) player, a digital video recorder (DVR), a cellular phone equipped with video functionality, a personal device assistant (PDA), a game playing device, or a personal computer (PC) that is configured to present a video-based media content event that is received in a media content stream 118. Other types of output devices may also be coupled to the media device 102, including those providing any sort of stimuli sensible by a human being, such as temperature, vibration and the like. In some embodiments, the media device 102 and one or more of the components of the media presentation system 120 may be integrated into a single electronic device.

The non-limiting exemplary media device 102 comprises a media content stream interface 202, a processor system 204, a memory medium 206, a at least one content buffer 208, an optional digital video recorder (DVR) 210, a presentation device interface 212, a remote interface 214, a multi-media table interface 216, and an optional blue tooth transceiver (BTT) 218. The memory medium 206 comprises portions for storing the media device logic 220, the electronic program guide (EPG) information 222, an optional browser 226, multi-media table interface logic 228, and the multi-media table data 230. In some embodiments, the media device logic 220, the browser 226 and the multi-media interface logic 228 may be integrated together, and/or may be integrated with other logic. In other embodiments, some or all of these memory and other data manipulation functions may be provided by using a remote server or other electronic devices suitably connected via the Internet or otherwise to a client device. Other media devices 102 may include some, or may omit some, of the above-described media processing components. Further, additional components not described herein may be included in alternative embodiments.

The non-limiting exemplary multi-media table controller 116 comprises a media device interface 232, a processor system 234, a memory medium 236, a remote interface 238, a display interface 240 and an optional content buffer 242. The memory medium 236 comprises portions for storing the multi-media table logic 244, media device interface logic 246, an optional browser 248, and the working applications 250. Some embodiments of the multi-media table controller 116 may also include an optional blue tooth transceiver (BTT) 218. In some embodiments, the multi-media table logic 244, media device interface logic 246, and the optional browser 248 may be integrated together, and/or may be integrated with other logic. In other embodiments, some or all of these memory and other data manipulation functions may be provided by using a remote server or other electronic devices suitably connected via the Internet or otherwise to a client device. Other multi-media table controllers 116 may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more multiple media content streams 118 multiplexed together in one or more transport channels. The transport channels with the media content streams 118 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 118 include a cable system, a radio frequency (RF) communication system, and the Internet.

The one or more media content streams 118 are received by the media content stream interface 202. One or more tuners 202a in the media content stream interface 202 selectively tune to one of the media content streams 118 in accordance with instructions received from the processor system 204. The processor system 204, executing the media device logic 220 and based upon a request for a media content event of interest specified by a user, parses out media content associated with the media content event of interest. The media content event of interest is then assembled into a stream of video and/or audio information which may be stored by the content buffer 208 such that the media content can be streamed out to components of the media presentation system 120, such as the visual display device 122 and/or the audio presentation device 124, via the presentation device interface 214. Alternatively, or additionally, the parsed out media content may be saved into the DVR 210 for later presentation. The DVR 210 may be directly provided in, locally connected to, or remotely connected to, the media device 102. In alternative embodiments, the media content streams 118 may stored for later decompression, processing and/or decryption. In embodiments with multiple tuners 202a, different content may be presented by the multi-media table 104, may be presented by the media presentation system 120, and/or may be stored into the DVR 210 or another suitable memory medium.

From time to time, information populating the EPG information 222 portion of the memory medium 206 is communicated to the media device 102, via the media content stream 118 or via another suitable media. The EPG information 222 of the memory medium 206 stores the information pertaining to the scheduled programming of broadcasting media content events. The information may include, but is not limited to, a scheduled presentation start and/or end time, a program channel, and descriptive information. The program's descriptive information may include the title of the program (interchangeably referred to herein as a media content event), names of performers or actors, date of creation, and a summary describing the nature of the program. Any suitable information may be included in the program's supplemental information. Upon receipt of a command from the user requesting presentation of an EPG display, the information in the EPG information 222 is retrieved, formatted, and then presented on the display 126 or the touch-sensitive display 106 as an EPG.

As described herein, the exemplary media device 102 and/or the multi-media table controller 116 are configured to receive commands from a user via the remote control 138. The remote control 138 includes one or more controllers 140 and an optional display (not shown) residing on the surface of the remote control 138. The user, by actuating one or more of the controllers 140, or icons presented on the display when configured as a touch sensitive type display, causes the remote control 138 to generate and transmit commands, via a wireless signal 142. The remote interface 214 of the media device 102 is configured to detect the wireless signal 142 such that the processor system 204 can determine the user's intended commands generated by and issued from the remote control 138.

Similarly, the remote interface 238 of the multi-media table controller 116 is configured to detect the wireless signal 142. When a detected wireless signal 142 is detected by the multi-media table controller 116, the multi-media table controller 116 determines if the intended command therein is for control of the multi-media table 104. Then, the processor system 234 can determine the user's intended commands generated by and issued from the remote control 138, and implement those operations on the multi-media table 104. For example, one of the controllers 140 may be configured to power on/off (turn on/turn off) the multi-media table 104 and/or other electronic devices. In response to detecting a wireless signal 142 issued from the remote control 138, the multi-media table 104 may transition to the powered on/off state.

As another nonlimiting example, a controller 140 is associated with presentation of an EPG. The media device interface logic 246, in response to detecting that wireless signal 142, can access the EPG information 222 from the media device 102. The multi-media table controller 116 can then generate an EPG that is presented to the user on the touch-sensitive display 106.

As yet another example, another controller 140 is associated with a channel change operation. The media device interface logic 246, in response to detecting that corresponding wireless signal 142, may communicate the channel change request by the user to the media device 102. Then, the media content event associated with the channel change operation may be received from the media device 102 and then be presented to the user on the touch-sensitive display 106.

The processes performed by the media device 102 relating to the processing of the received media content stream 118 and communication of a presentable media content event to the components of the media presentation system 120 are generally implemented by the processor system 204 while executing the media device logic 220. Thus, the media device 102 may perform a variety of functions related to the processing and presentation of one or more media content events received in the media content stream 118.

The processes performed by the multi-media table controller 116 relating to the execution of the plurality of applications residing in the working applications 250 portion of the memory medium 236, the processing of any received media content streams received from the media device 102, and communication of video content event to the touch-sensitive display 106 are generally implemented by the processor system 234 while executing the multi-media table logic 244. Thus, the multi-media table controller 116 may perform a variety of functions related to the processing and presentation of video and/or audio information in accordance with directions for the user of the multi-media table 104.

The multi-media table interface 216 and the media device interface 232 are interface devices configured to communicatively couple the media device 102 and the multi-media table controller 116, respectively. The interfaces 216, 232 may be configured to receive and transmit bi-directional communications between the media device and the multi-media table controller 116. Some interfaces 216, 232 may be optionally configured to communicate using a plurality of different communication mediums, such as a wireless communication medium or a wire-based communication medium.

The display interface 240 of the multi-media table controller 116 communicatively couples the multi-media table controller 116 and the touch-sensitive display 106. The display interface 240 is configured to support bidirectional communications so that the multi-media table controller 116 can control presentation of graphical information on the touch-sensitive display 106, and so that the touch-sensitive display 106 can communicate information to the multi-media table controller 116 about detected gesture-based touch movements made by the user on the touch-sensitive display 106.

The presentation device interface 214 of the media device 102 is configured to communicate video and audio content to the components of the media presentation system 120. In some embodiments, the display 126 is itself a touch sensitive display that can sense gesture-based touch movements made to the display 106. In such embodiments, the presentation device interface 214 supports bidirectional communications so that the media device 102 may receive information from the touch-sensitive display 106, and then perform such user operations that have been received. Further, information and/or content changes made based on user commands received from the touch-sensitive display 126 may be communicated from the media device 102 to the multi-media table controller 116 such that content or operations can be changed by the multi-media table 104.

The working applications 250 portion of the memory medium 244 stores a plurality of different applications, interchangeably known as programs, that may be executed by the processor system 234. An application, executing under the control of the processor system 234, typically generates graphical content that is presented on the touch-sensitive display 106. If audio content is generated, it may be presented by the speaker 114. As noted herein, the generated graphical and/or audio content may be communicated to the media device 102 so that it may be presented on the display 126 and/or speakers 128 of the media presentation system 120 by the media device 102.

The media device 102 is configured to record (save) media content event into the DVR 210 and/or into another suitable memory medium. The recordings may be scheduled in advance by the user by setting start and end record timers or the like, and information that identifies the media content event of interest that is to be recorded (such as by channel, title, and/or content provider).

Embodiments of the media device 102 may optionally, at the initiation of a recording (or at some predefined duration prior to the start of the recording), generate and communicate information, referred to herein as a recording notification message, to the multi-media table 104. The recording notification message indicates that the recording of the media content event is ready to, or beginning to, record. In response to receiving the recording notification message, the multi-media table controller 116 generates a corresponding recording notification graphical message 252 that is presented to the user on the touch-sensitive display 106 and/or a corresponding audio message that is presented by the speaker 114. For example, a relatively small pop-up graphic window or the like may be presented on the touch-sensitive display 106 indicating that the media content event with the "Title X will begin recording in five minutes, do you wish to view this event?" Any suitable recording notification message may be generated and presented by the various embodiments. Thus, the user of the multi-media table 104 becomes aware of the recording media content event, and may optionally choose to modify the recording and/or to receive the media content event from the media device 102 for presentation on the touch-sensitive display 106.

In some embodiments, after the recording notification message is generated and then presented on the touch-sensitive display 106, a user confirmation to record the media content event is required. That is, user input may be required before the media content event is recorded. In the absence of the user confirmation to the recording notification message, the recording will not occur.

In some embodiments, the user may optionally respond to the recording notification message if they wish that the recording media content event is also presented on the touch-sensitive display 106. In response to the user input, the recording media content event is communicated from the media device 102 and is then presented on the touch-sensitive display 106.

Alternatively, the media content event may be automatically presented on the touch-sensitive display 106 if the user does not otherwise respond to the notification message and if the multi-media table 104 is in use. The recording media content event may replace the currently presenting media content event on the touch-sensitive display 106. Alternatively, the recording media content event may be presented in another portion of the touch-sensitive display 106 concurrently with the currently presenting media content event on the touch-sensitive display 106.

Some embodiments of the multi-media table controller 116 (or the multi-media table 104) and the media device 102 may be optionally provisioned with the blue tooth transceiver 218. Blue tooth technology provides a short range wireless communication medium for communication of audio content. In an example embodiment, a first blue tooth transceiver 218 is configured to monitor for and detect (commonly referred to as discovery process or the like) the presence of a second blue tooth transceiver 218. If the second blue tooth transceiver 218 is detected, then the detecting first blue tooth transceiver 218 determines the identity of electronic device that is associated with the second blue tooth transceiver 218 and initiates a communication link (commonly referred to as synchronization or the like). Then the first blue tooth transceiver 218 can begin to receive or transmit audio content to the second blue tooth transceiver 218.

For example, the blue tooth transceiver 218 in the multi-media table controller 116 may monitor for any emitted communications for the blue tooth transceiver 218 in the media device 102. Such emitted communications would indicates that the media device 102 is being used by the user or another person.

In an example embodiment, if the blue tooth transceiver 218 of the multi-media table 104 may detect communications emitted from the blue tooth transceiver 218 at the media device 102. In response to detecting the blue tooth communications, a suitable notification message is generated by the multi-media table controller 116 and is then presented to the user on the touch-sensitive display 106. The user of the multi-media table 104 may then become aware that the media device 102 has been activated and/or that the media device 102 has been brought into proximity of the multi-media table 104 (within the range of detection by the blue tooth transceiver 218 of the multi-media table 104). The notification message may permit the user to respond via the touch-sensitive display 106 so that any media content events that are available on the media device are presented on the touch-sensitive display 106. Alternatively, or additionally, an EPG or the like may be generated and presented to the user on the touch-sensitive display 106. Accordingly, the user may then operate the media device 102, via the touch-sensitive display 106, to access and then present a media content event of interest that is accessible by the media device 102. For example, if a child begins to use the media device 102 to view content, the parent using the multi-media table 104 can become aware of the child's activities in response to viewing the notification message, and may optionally monitor the media content event that is being presented to the child.

In some situations, an electronic media content device 132 may be communicatively coupled and controllably coupled to the media device 102. That is, the media device 102 may be able to control the receipt of media content from the electronic media content device 132. Embodiments may be configured to permit the user to also control the electronic media content device 132 via gesture-based touch movements made to the touch-sensitive display 106. For example, if a particular electronic media content device 132 is known to be controllably coupled to the media device 102, suitable content control graphical icons 156 that control operation of the electronic media content device 132 may be presented on the touch-sensitive display 106. Based on the user's detected "touches" on the active areas associated with those particular content control graphical icons 156, the multi-media table controller 116 may generate and communicate corresponding media device commands to the media device 102. The media device 102 then controls the electronic media content device 132 in accordance with the instructions in the media device commands received from the multi-media table controller 116.

For example, if the electronic media content device 132 is a digital video disc (DVD) player, the user may manage presentation of a DVD being played by the DVD player via the touch-sensitive display 106. In an example embodiment, a graphical representation of the DVD player may be presented on the touch-sensitive display 106, wherein active regions on the graphical image of the DVD player correspond to physical controls of the DVD player. Thus, the user may select to operate the DVD player by "touching" the corresponding active areas on the image of the DVD player presented on the touch-sensitive display 106. (Alternatively, or additionally, the user might also control the DVD player via a presented remote control emulating icon 158.)

Further, in some embodiments, one of the graphical icons 148 may resemble the DVD player, or at least be intuitively understood by the user to be associated with the DVD player. In response to a selection of the user (by touching that associated graphical icon 148), the larger controllable image of the DVD player is presented on the touch-sensitive display 106 with active regions that correspond to the physical controllers of the DVD player. Accordingly, the user can then control the DVD player via the touch-sensitive display 106 by "touching" the corresponding active areas of the graphical image of the DVD player. In some embodiments, in response to the user's "touch" of the graphical icon 148 associated with the DVD player, the DVD player may be transitioned into a power state (turned on) and/or the media device 102 may be transitioned into a power state (turned on). Once the DVD player (and the controlling media device 102) are powered, the user can then control either the media device 102 and/or the DVD player to control presentation of media content by the DVD player. Other electronic media content devices 132 may be similarly operated.

Various types of media devices 102 may be optionally communicatively and controllably and/or communicatively coupled to other electronic devices 134. Examples of an electronic device 134 include controlled appliances that the user may wish to control. Alternatively, or additionally, some electronic device 134 may provide some sort of sensed data that is of interest to the user. Examples of electronic devices 134 include cameras, home security systems, telephones, lights, appliances, audio systems, slaved media devices (that receive requested content from the media device 102), or the like. Thus, any electronic device 134 that can provide information to and/or be controlled by the media device 102 may also provide information to and/or be controlled by the multi-media table 104 based on the user's input provided to the touch-sensitive display 106.

The multi-media table interface logic 228 of the media device 102 is retrieved and executed by the processor system 204 of the media device 102 so that communications to the multi-media table 104 and from the multi-media table 104 are managed by the media device 102. In an example embodiment, the multi-media table interface logic 228 is used to manage the communication of the media content event to the multi-media table 104 using a format that is used by the multi-media table controller 116 to process and prepare the media content for presentation on the touch-sensitive display 106. Conversely, the multi-media table interface logic 228 facilitates receiving and processing control instructions from the multi-media table 104 so that the media device 102 and/or components of the media presentation system 120 are operated in accordance with the user's instructions that are input by the user via the touch-sensitive display 106.

The media device interface logic 246 of the multi-media table 104 is retrieved and executed by the processor system 234 of the multi-media table controller 116 so that communications to the media device 102 and/or other controllably connected devices are managed by the multi-media table controller 116. In an example embodiment, the media device interface logic 246 is used to manage the received media content event using a format that is used by the touch-sensitive display 106 to present the media content. Conversely, the media device interface logic 246 facilitates generating and communicating control instructions from the multi-media table 104 to the media device 102 and/or components of the media presentation system 120 which are then operated in accordance with the user's instructions that are input by the user via the touch-sensitive display 106.

It is appreciated by one skilled in the art that there are numerous different types of media devices 102 and multi-media tables 104. Each different media device 102 and multi-media table 104 may employ different forms of data communication formats. This, it is highly problematic that any particular user's media device 102 will be immediately compatible with the user's multi-media table 104. In some embodiments, information about a plurality of different multi-media tables 104 is stored in the multi-media table data 230 region of the memory medium 206 of the media device 102. When the media device 102 and the particular multi-media table 104 are initially communicatively coupled together, the media device 102 may identify an identity or characteristics of the multi-media table 104. Once the media device 102 has identified the multi-media table 104 (or characteristics pertaining to the multi-media table 104) access various information such as communication formats or other information that is particular to the identified multi-media table 104 can be accessed by the media device 102. Based on the accessed information, the media device 102 may configured itself for communications with that particular multi-media table 104. Alternatively, the media device 102 may use its optional browser 226 to access a remote site (not shown) to access and retrieve the communication formats or other information that is particular to the identified multi-media table 104. This process of establishing communication connectivity with the multi-media table 104 may be managed by the multi-media table interface logic 228. Accordingly, a media device 102 can be configured to communicatively couple to a plurality of different multi-media tables 104 since the unique operating characteristics and/or requirements of an identified multi-media table 104 can be accessed by the media device 102 as needed.

As noted herein, the user may control presentation of media content on the touch-sensitive display 106 and/or by the components of the media presentation system 120 using various trick function operations via the touch-sensitive display 106. Some embodiments of the media device 102 are provisioned with a single content buffer 208a that receives the broadcasting media content events. Alternatively, a media content event may be received from the DVR 210 and/or an electronic media content device 132. When a trick function operation is performed to control presentation of a media content event, the trick function operation is performed on the media content event as it is being processed in the single content buffer 208a such that the presentation of the media content event is the same on both the display 126 and the touch-sensitive display 106. For example, but not limited to, if a pause operation is performed, presentation of the media content event is paused on both the display 126 and the touch-sensitive display 106 since the content pause occurs by controlling the content output from the single content buffer 208a.

However, some embodiments of the media device 102 may be configured with a second content buffer 208b. In such embodiments, a media content event streamed to the multi-media table 104 can be separately controlled with a trick function operation while the media content event being streamed out to the media presentation system 120 from the content buffer 208a may remain unchanged (or vice versa). For example, a user of the multi-media table 104 can pause presentation of the media content event on the touch-sensitive display 106 (since the pause trick function operation is performed at the content buffer 208b) while presentation of the media content event continues without pause on the display 126. In some situations, different media content events can be processed by the content buffers 208a and 208b such that a first media content event is presented on the touch-sensitive display 106 and a different second media content event is presented by the media presentation system 120. Further, the different media content events can be received from different sources, such as the media content stream interface 202, the DVR 210, and/or an electronic media content device 132.

Alternatively, some embodiments of the media device 102 may be configured with a partionable content buffer 208 that can be partitioned into different memory regions by the media device 102 as needed. For example, if the user of the multi-media table 104 initiates a pause trick function operation to pause presentation of the media content event on the touch-sensitive display 106 (while the pause trick function operation is not to be made on the media content event being presented by the media presentation system 120), the content can be paused on a first partition region of the content buffer 208 that is processing the media content event, while another partition region of the content buffer 208 continues to process and buffer the continuing presentation of the media content event by the media presentation system 120. In some situations, different media content events can be processed by the content buffer 208 such that a first media content event is presented on the touch-sensitive display 106 and a different second media content event is presented by the media presentation system 120. Further, the different media content events can be received from different sources, such as the media content stream interface 202, the DVR 210, and/or an electronic media content device 132.

Alternatively, or additionally, some embodiments of the multi-media table controller 116 include the optional content buffer 242. Thus, a streaming media content event can be received by the multi-media table 104 and buffered into the content buffer 242 of the multi-media table controller 116. Then, the trick function operations requested by the user via the touch-sensitive display 106 can be managed and processed at the content buffer 242 under the control of the multi-media table controller 116. The media device 102 continues to process the media content event without having to perform the trick function being performed at the multi-media table 104.

It is appreciated by one skilled in the art that embodiments of the media device 102 that are configured to separately control presentation of a media content event at the touch-sensitive display 106 and by the media presentation system 120 may be configured with a plurality of decoders (not shown). Each decoder separately processes and decodes the received media content event streams. Such decoders may reside in the media device 102 and/or in the multi-media table controller 116.

It should be emphasized that the above-described embodiments of the multi-media table interface system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for content presentation on a touch-sensitive display of a multi-media table that is communicatively coupled to a media device that is operable to access media content, the method comprising:
   executing an application using a processor system of the multi-media table, wherein the executing application generates an output graphics that is presented on a first portion of the touch-sensitive display of the multi-media table,
   presenting a media content event that is received from the media device on a second portion of the touch-sensitive display of the multi-media table concurrently with presentation of the output graphics of the executing application;
   presenting a graphical icon on a third portion of the touch-sensitive display concurrently with presentation of the output graphics of the executing application and the media content event, wherein the graphical icon represents an image of an electronic device communicatively coupled to the media device that controls presentation of media content, wherein the electronic device is controllable by the media device;
   receiving, at the touch-sensitive display of the multi-media table, a user selection of the graphical icon;
   presenting, in response to receiving the user selection of the graphical icon, a graphical image of the electronic device that is controlled by the media device on a fourth portion of the touch-sensitive display,
   wherein the first portion, the second portion, the third portion and the fourth portion of the touch-sensitive display of the multi-media table are different portions on the touch-sensitive display.

2. The method of claim 1,
   wherein the graphical icon representing the electronic device is smaller than the graphical image of the electronic device,
   wherein the graphical image of the electronic device comprises a plurality of active areas, and
   wherein each of the plurality of active areas of the graphical image of the electronic device uniquely correspond to a controller on the electronic device that is used to control presentation of the media content event by the electronic device.

3. The method of claim 1, wherein the first portion, the second portion, and the third portion of the touch-sensitive display of the multi-media table are different portions on the touch-sensitive display, and where the fourth portion is presented over at least a part of the third portion in response to receiving the user selection of the graphical icon that is presented in the third portion of the touch-sensitive display.

4. The method of claim 1, wherein receiving the user selection of the graphical icon comprises:
   detecting a gesture-based touch movement made by a user on the touch-sensitive display of the multi-media table, wherein the gesture-based touch movement is on at least a portion of the presented graphical icon that represents the electronic device; and determining, based on the detected gesture-based touch movement, a user command to initiate control of an operation of the electronic device,
wherein the graphical image of the electronic device is presented in response to detecting the gesture-based touch movement.

5. The method of claim 4, wherein the detected gesture-based touch movement is a first gesture-based touch movement, and wherein after presentation of the graphical image of the electronic device occurs, the method further comprising:
detecting a second gesture-based touch movement made by the user on the touch-sensitive display of the multi-media table, wherein the gesture-based touch movement is on one of a plurality of active areas of the graphical image of the electronic device;
determining, based on the detected second gesture-based touch movement, an intended user command to control the operation of the electronic device;
generating, at the multi-media table, a media device command that corresponds to the intended user command; and
communicating the generated media device command from the multi-media table to the media device,
wherein the media device controls the electronic device in accordance with the intended user command to control the operation of the electronic device.

6. The method of claim 1, wherein a first graphical icon that is presented on the second portion of the touch-sensitive display represents an image of a digital video disc (DVD) player that is communicatively coupled to the media device and that is controllable by the media device, and wherein in response to receiving the user selection of the graphical icon representing the DVD player, the method comprises:
presenting a graphical image of the DVD player on a third portion of the touch-sensitive display in response to receiving the user selection of the graphical icon,
wherein the first graphical icon corresponding to the DVD player is smaller than the graphical image of the DVD player,
wherein the graphical image of the DVD player comprises a plurality of active areas, and
wherein each of the plurality of active areas of the graphical image of the DVD player uniquely correspond to a controller on the DVD player that is used to control presentation of the media content event by the DVD player.

7. The method of claim 1, wherein a first graphical icon that is presented on the second portion of the touch-sensitive display represents an image of a digital video recorder (DVR) that resides in the media device and that is controllable by the media device, and wherein in response to receiving the user selection of the graphical icon representing the DVR, the method comprises:
presenting a graphical image corresponding to the DVR on a third portion of the touch-sensitive display in response to receiving the user selection of the graphical icon,
wherein the first graphical icon corresponding to the DVR is smaller than the graphical image of the DVR,
wherein the graphical image of the DVR comprises a plurality of active areas, and
wherein each of the plurality of active areas of the graphical image of the DVR uniquely correspond to a controller of the DVR that is used to control recording and presentation of the media content event by the DVR.

8. The method of claim 1, wherein a first graphical icon that is presented on the second portion of the touch-sensitive display represents an image of a media presentation system that is communicatively coupled to the media device and that is controllable by the media device, and wherein in response to receiving the user selection of the graphical icon representing the media presentation system, the method comprises:
presenting a graphical image of the media presentation system on a third portion of the touch-sensitive display in response to receiving the user selection of the graphical icon,
wherein the first graphical icon corresponding to the media presentation system is smaller than the graphical image of the media presentation system,
wherein the graphical image of the media presentation system comprises a plurality of active areas, and
wherein each of the plurality of active areas of the graphical image of the media presentation system uniquely correspond to a controller on the media presentation system that is used to control presentation of the media content event by the media presentation system.

9. The method of claim 8, wherein a first graphical icon that is presented on the second portion of the touch-sensitive display represents an image of a visual display device that is communicatively coupled to the media device and that is controllable by the media device, and wherein in response to receiving the user selection of the graphical icon representing the visual display device, the method comprises:
presenting a graphical image of the visual display device on the fourth portion of the touch-sensitive display in response to receiving the user selection of the graphical icon,
wherein the first graphical icon corresponding to the visual display device is smaller than the graphical image of the visual display device,
wherein the graphical image of the visual display device comprises a plurality of active areas, and
wherein each of the plurality of active areas of the graphical image of the visual display device uniquely correspond to a controller on the visual display device that is used to control presentation of the media content event by the visual display device.

10. The method of claim 8, wherein a first graphical icon that is presented on the second portion of the touch-sensitive display represents an image of an audio presentation device that is communicatively coupled to the media device and that is controllable by the media device, and wherein in response to receiving the user selection of the graphical icon representing the audio presentation device, the method comprises:
presenting a graphical image of the audio presentation device on the fourth portion of the touch-sensitive display in response to receiving the user selection of the graphical icon,
wherein the first graphical icon corresponding to the audio presentation device is smaller than the graphical image of audio presentation device,
wherein the graphical image of the audio presentation device comprises a plurality of active areas, and
wherein each of the plurality of active areas of the graphical image of the audio presentation device uniquely correspond to a controller on the audio presentation device that is used to control presentation of the media content event by the audio presentation device.

11. The method of claim 1, wherein the user selection of the graphical icon that represents an image of an electronic device is a first user selection, the method further comprising:

presenting a plurality of media device content control graphical icons on a fifth portion of the touch-sensitive display concurrently with presentation of the output graphics of the executing application and the media content event, wherein each one of the plurality of media device content control graphical icons represents an image of a control function performed by the media device to control presentation of media content;

receiving, at the touch-sensitive display of the multi-media table, a second user selection of one of the plurality of media device content control graphical icons; and communicating control information from the multi-media table to the electronic device or the media device in response to the second user selection, wherein the communicated information corresponds to the control function associated with the received second user selection that is to be performed by the media device; and receiving, at the multi-media table from the media device, controlled presentation of the media content event that is being shown on the second portion of the touch-sensitive display in accordance with the control function associated with the received second user selection.

12. The method of claim 11, wherein the media content event is concurrently being presented by a media presentation system that is controlled by the media device prior to communicating the control information corresponding to the control function associated with the received second user selection, and wherein presentation of the media content event by the media presentation system remains unchanged after presentation of the media content event being presented on the touch-sensitive display is controlled in accordance with the control function associated with the received second user selection.

13. The method of claim 12, wherein controlling presentation of the media content event that is being shown on the second portion of the touch-sensitive display in accordance with the control function associated with the received second user selection comprises:

controlling presentation of the media content event that is being shown on the second portion of the touch-sensitive display using a trick function operation associated with the received second user selection, wherein when the trick function operation is a pause operation, presentation of the media content event being shown on the second portion of the touch-sensitive display pauses while presentation of the media content event by the media presentation system remains unchanged, wherein when the trick function operation is a fast forward operation, presentation of the media content event being shown on the second portion of the touch-sensitive display fast forwards while presentation of the media content event by the media presentation system remains unchanged;

wherein when the trick function operation is a fast rewind operation, presentation of the media content event being shown on the second portion of the touch-sensitive display fast rewinds while presentation of the media content event by the media presentation system remains unchanged;

wherein when the trick function operation is a jump forward operation, presentation of the media content event being shown on the second portion of the touch-sensitive display jumps forward by a first predefined duration while presentation of the media content event by the media presentation system remains unchanged;

wherein when the trick function operation is a jump backward operation, presentation of the media content event being shown on the second portion of the touch-sensitive display jumps backward by a second predefined duration while presentation of the media content event by the media presentation system remains unchanged;

wherein when the trick function operation is a slow motion forward operation, presentation of the media content event being shown on the second portion of the touch-sensitive display moves forward in slow motion while presentation of the media content event by the media presentation system remains unchanged; and wherein when the trick function operation is a slow motion rewind operation, presentation of the media content event being shown on the second portion of the touch-sensitive display moves backwards in slow motion while presentation of the media content event by the media presentation system remains unchanged.

14. The method of claim 11, wherein the media content event is concurrently being presented by a media presentation system that is controlled by the media device, and wherein presentation of the media content event by the media presentation system is also controlled in accordance with the control function associated with the received second user selection.

15. The method of claim 1, wherein the user selection of the graphical icon that represents an image of an electronic device is a first user selection, the method further comprising:

presenting a plurality of media device content control graphical icons on a fifth portion of the touch-sensitive display concurrently with presentation of the output graphics of the executing application and the media content event, wherein each one of the plurality of media device content control graphical icons represents an image of a controller with a function that is performed by the media device to control presentation of media content that is being presented by a component of a media presentation system that is communicatively coupled to the media device;

receiving, at the touch-sensitive display of the multi-media table, a second user selection of one of the plurality of media device content control graphical icons; and controlling presentation of the media content event that is being presented by at least one of the components of the media presentation system in response to the received second user selection, wherein presentation of the media content event shown on the second portion of the touch-sensitive display remains unchanged.

16. The method of claim 15, wherein controlling presentation of the media content event that is being presented by at least one of the components of the media presentation system in response to the received second user selection comprises one of:

increasing audio output volume level of the media content event that is being presented by at least one of the components of the media presentation system in response to the received second user selection;

decreasing audio output volume level of the media content event that is being presented by at least one of the components of the media presentation system in response to the received second user selection;

changing presentation from the media content event to a different media content event; and turning on or turning off one or more of the components of the media presentation system.

17. The method of claim 1, wherein the user selection of the graphical icon that represents an image of an electronic device is a first user selection, the method further comprising:

presenting a remote control icon on a fifth portion of the touch-sensitive display concurrently with presentation of the output graphics of the executing application and the media content event, wherein the remote control icon represents a remote control that controls presentation of media content the by media device, and wherein the remote control icon has a plurality of active regions that each correspond to one of a plurality of controllers disposed on a surface of the remote control;

receiving from the media device, when one of the controllers of the remote control is actuated to control operation of the media device, information that indicates that the controller of the remote control has been actuated; and changing an appearance of the presentation of a corresponding active area of the remote control icon to indicate actuation of the corresponding controller of the remote control.

18. The method of claim 17, further comprising:

changing presentation of the media content event being presented on the second portion of the touch-sensitive display of the multi-media table in response to receiving the information that indicates that the controller of the remote control has been actuated, wherein presentation of the media content event is changed in accordance with a function of the actuated controller on the remote control.

19. The method of claim 17, wherein presentation of the media content event on the touch-sensitive display is not changed in response to receiving the information that indicates that the controller of the remote control has been actuated, the method further comprising:

receiving, at the touch-sensitive display of the multi-media table, a second user selection of one of the active area of the remote control icon that has its appearance changed in response to receiving the information that indicates that the controller of the remote control has been actuated; and controlling presentation of the media content event that is being shown on the second portion of the touch-sensitive display in accordance with the control function associated with the second user selection of the active area of the remote control icon, wherein presentation of the media content event is changed in accordance with a function of the actuated controller on the remote control.

20. The method of claim 1, further comprising:

detecting a gesture-based touch movement made by a user on at least a part of the second portion of the touch-sensitive display;

determining, based on the detected gesture-based touch movement, an intended user command, wherein the intended user command corresponds to one of a first user intent to initiate control of an operation of the electronic device or the media device, or corresponds to second user intent to change an appearance of the second portion of the touch-sensitive display that is presenting the media content event;

communicating information from the multi-media table to the media device in response to determining that the detected gesture-based touch movement corresponds to the first user intent; and changing the appearance of the second portion of the touch-sensitive display in response to determining that the detected gesture-based touch movement corresponds to the second user intent, wherein no information pertaining to the second user intent is communicated from the multi-media table to the media device.

* * * * *